United States Patent

Kim

[11] Patent Number: 5,878,170
[45] Date of Patent: Mar. 2, 1999

[54] METHOD AND APPARATUS FOR RECONSTRUCTING CONTOURS IN A CONTOUR IMAGE DECODER

[75] Inventor: Jin-Hun Kim, Seoul, Rep. of Korea

[73] Assignee: Daewoo Electronics Co., Ltd., Seoul, Rep. of Korea

[21] Appl. No.: 868,862

[22] Filed: Jun. 4, 1997

[30] Foreign Application Priority Data

Apr. 11, 1997 [KR] Rep. of Korea ............... 1997-13368

[51] Int. Cl.$^6$ .................... G06K 9/48; G06T 9/20
[52] U.S. Cl. ................ 382/242; 382/254; 382/266
[58] Field of Search ................. 382/242, 254, 382/266, 269

[56] References Cited

U.S. PATENT DOCUMENTS

| | | | |
|---|---|---|---|
| 4,020,462 | 4/1977 | Morrin II | 382/242 |
| 5,635,986 | 6/1997 | Kim | 382/242 |
| 5,675,669 | 10/1997 | Kim | 382/242 |
| 5,774,596 | 6/1998 | Kim | 382/242 |

*Primary Examiner*—Scott Rogers
*Attorney, Agent, or Firm*—Anderson, Kill & Olick, P.C.

[57] ABSTRACT

A contour of an object in an image having one or more objects therein is reconstructed based on encoded contour data for the contour and a previously reconstructed contour for an object included in the image. The method, first, decodes the encoded contour data for a current contour to thereby provide a reconstructed current contour and checks whether the reconstructed current contour overlaps with any previously reconstructed contours. If none of the previously reconstructed contours overlaps with the reconstructed current contour, the method sets the reconstructed current contour as a currently reconstructed contour. If, otherwise, the reconstructed current contour overlaps with a previously reconstructed contour, the reconstructed current contour is modified not to overlap with the previously reconstructed contour and the method sets the modified contour as the currently reconstructed contour.

6 Claims, 4 Drawing Sheets

METHOD AND APPARATUS FOR RECONSTRUCTING CONTOURS IN A CONTOUR IMAGE DECODER

FIELD OF THE INVENTION

The present invention relates to a method and apparatus for decoding a video signal; and, more particularly, to a method and apparatus capable of decoding contours of objects contained in a video signal more precisely, thereby reducing reproduction errors in the decoded contours.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, there have been proposed several methods to encode the contour information including a polygonal approximation.

In the polygonal approximation, initial vertices of a contour are detected from a multiplicity of contour pixels constituting the contour. That is, if the contour is an open loop, the two ending points of the open loop are determined as the initial vertices of the contour, and, if otherwise, the farthest two points on the contour become the initial vertices. After detecting two vertices on the contour, a straight line is drawn between the two vertices. And then perpendicular distances from contour pixels on a contour segment connecting the two vertices to the straight line are determined. Among the contour pixels on the contour segment corresponding to the straight line, a contour pixel having a largest perpendicular distance is detected as a next vertex if the largest perpendicular distance is greater than a predetermined threshold value. By recursively performing the above process, a number of vertices on the contour are detected and vertex information representing the positions of all the vertices on the contour is coded.

Referring to FIG. 1, there is shown a schematic block diagram of a conventional contour encoder 10 which includes a contour extraction block 11, a contour coding block 12, a contour type coding block 14, and a multiplexor (MUX) 16.

The contour extraction block 11 extracts contours from an inputted contour mask image and couples the extracted contours to the contour coding block 12 and the types of the extracted contours to the coding type coding block 14.

Furthermore, the contour extraction block 11 examines the type of each extracted contour to give the contour an index identifying whether it is an exterior or an interior contour, and transfers the indices of the contours to the contour type coding block 14, wherein the exterior contour represents a contour positioned at the outer boundary of an object and the interior contour denotes a contour at the boundary between an object and a hole inside the contour. Referring to FIGS. 3A and 4A, there are illustrated exemplary objects O(1), O(2) and O(3), each having exterior contours E(1), E(2) and E(3) and interior contours I(1), I(2) and I(3), respectively. The contour coding block 12 encodes the contours through the use of an contour approximation technique, e.g., polygonal approximation, to thereby provide encoded contours to the MUX 16. The contour indices are encoded at the contour type coding block 14 and provided to the MUX 16.

At the MUX 16, the encoded contours and indices are multiplexed and transmitted as encoded contour data to a transmitter(not shown) for the transmission thereof.

In a decoder at a receiving end, the contour of the object is reconstructed based on the encoded contour data from the transmitting end. In case, however, the contour is encoded based on the approximation technique, there usually occur approximation errors in the decoded contour, which entails a detrimental effect in the decoded image.

The possible errors that may occur in decoded contours are exemplified in FIGS. 3B and 4B, which illustrate decoded images of the objects shown in FIGS. 3A and 4A, respectively. The two separate exterior contours E(1) and E(2) of the two objects O(1) and O(2) shown in FIG. 3A are decoded into reconstructed contours E(1)' and E(2)' and merged together due to approximation errors as shown in FIG. 3B. FIG. 4B illustrates a reconstructed interior contour I(3)' protruding from the decoded exterior contour E(3)' due to approximation errors, wherein the interior contour I(3) is located inside the exterior contour E(3) in the original image as shown in FIG. 4A.

SUMMARY OF THE INVENTION

It is, therefore, an object of the present invention to provide a method and apparatus capable of compensating for the approximation errors in the reconstructed contour image.

In accordance with one aspect of the present invention, there is provided a method for reconstructing a contour of an object in an image having one or more objects therein based on encoded contour data for the contour and a previously reconstructed contour for an object included in the image, the method comprising the steps of: (a) decoding encoded contour data for a current contour to thereby provide a reconstructed current contour; (b) checking whether the reconstructed current contour overlaps with any of previously reconstructed contours; (c) if none of the previously reconstructed contours overlaps with the reconstructed current contour, setting the reconstructed current contour as a currently reconstructed contour; and (d) if the reconstructed current contour overlaps with a previously reconstructed contour, modifying the reconstructed current contour not to overlap with the previously reconstructed contour and setting the modified contour as the currently reconstructed contour.

In accordance with another aspect of the present invention, there is provided an apparatus for reconstructing a contour of an object in an image having one or more objects therein based on encoded contour data for the contour and a previously reconstructed contour for an object included in the image, wherein each contour in the image is categorized into one of exterior and interior contour types, encoded contour data for each contour includes an index identifying a type of each contour and an object to which each contour belongs and an exterior contour is reconstructed prior to an interior contour of an identical object, said apparatus comprising: means for storing one or more previously reconstructed contours; means for decoding the encoded contour data for a current contour to thereby detect a type of the current contour and provide a reconstructed current contour; and means, in response to the type of the current contour, for modifying the reconstructed current contour not to overlap with any one of the previously reconstructed contours.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
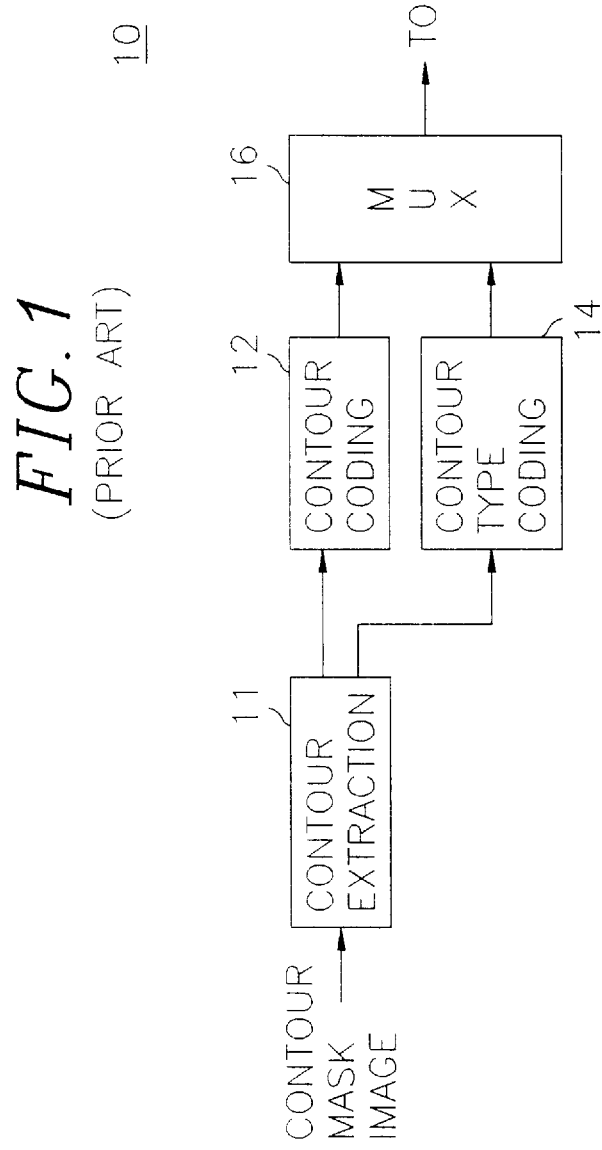
FIG. 1 depicts a schematic block diagram of a conventional apparatus for encoding a contour of an object, which provides encoded contour data inputted to an inventive decoding apparatus suggested of the present invention.
Figure 2:
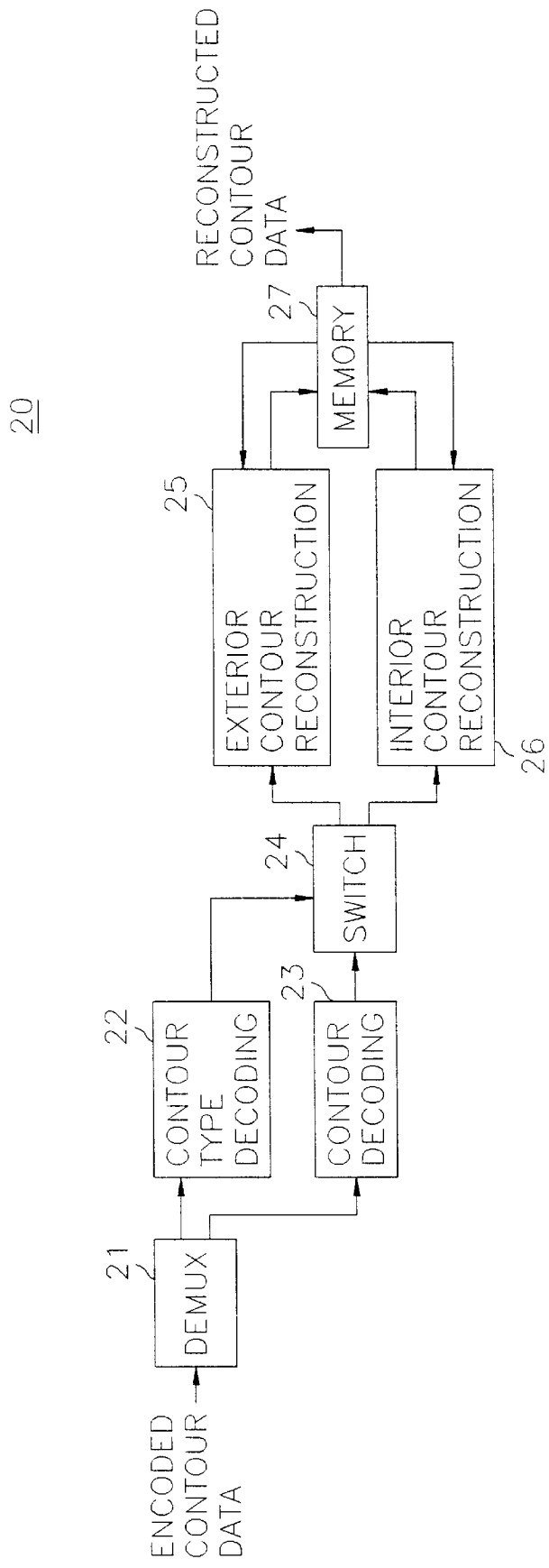
FIG. 2 presents a block diagram of the inventive decoding apparatus in accordance with the present invention.

Referring to FIG. 2, there is illustrated an inventive contour decoder for compensating for the approximation errors occurred in the decoded contour image, wherein the contour decoder 20 includes a demultiplexor(DEMUX) 21, a contour type decoding block 22, a contour decoding block 23, a switch 24, an exterior contour reconstruction block 25, an interior contour reconstruction block 26, a memory 27, and a mask reconstruction block 28.

Inputted to the DEMUX 21 is the encoded contour data from the transmitter(not shown), wherein the encoded contour data includes encoded contour information and encoded contour indices. The DEMUX 21 separates the encoded contour data into the encoded contour information and the encoded contour indices representing contour types and provides the same to the contour decoding block 23 and the contour type decoding block 22, respectively.

The contour type decoding block 22 decodes the encoded contour indices to thereby provide a contour index for each contour to the switch 24, the contour index representing an index and a type for a contour. The contour decoding block 23 decodes the encoded contour information into decoded contour data, e.g., decoded vertex data, for each contour and provides it to the switch 24.

Figure 3A:
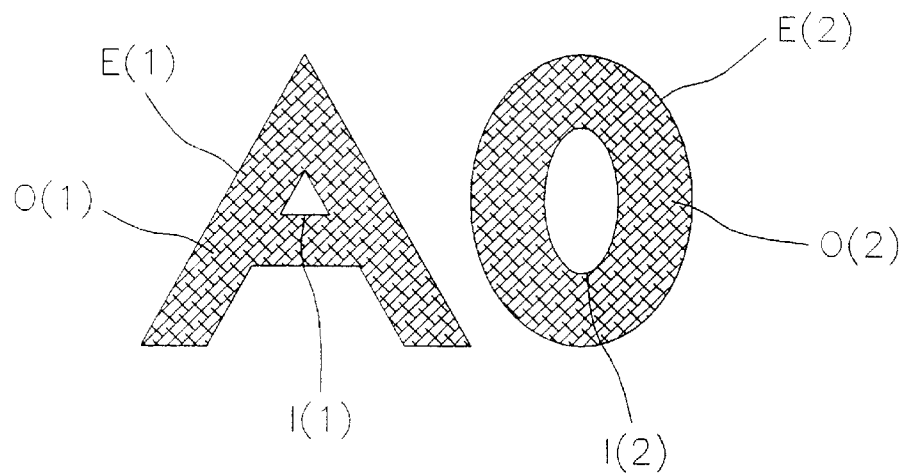
FIGS. 3A to 3C illustrate exemplary decodings of exterior contours.
Figure 4A:
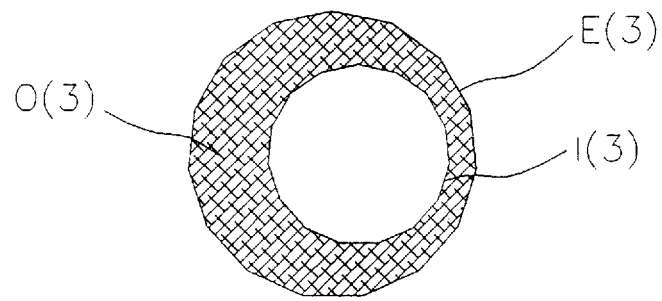
FIGS. 4A to 4C show exemplary decodings of an interior contour included in an exterior contour.

The switch 24 couples the decoded contour data for each contour and the contour index thereof either to the exterior contour reconstruction block 25 or the interior contour reconstruction block 26 based on the contour index for each contour inputted thereto. For instance, the decoded contour data for the exterior contours E(1) to E(3) and the decoded contour data for the interior contours I(1) to I(3) shown in FIGS. 3A and 4A are transferred to the exterior and interior contour reconstruction blocks 25 and 26, respectively.

Figure 3B:
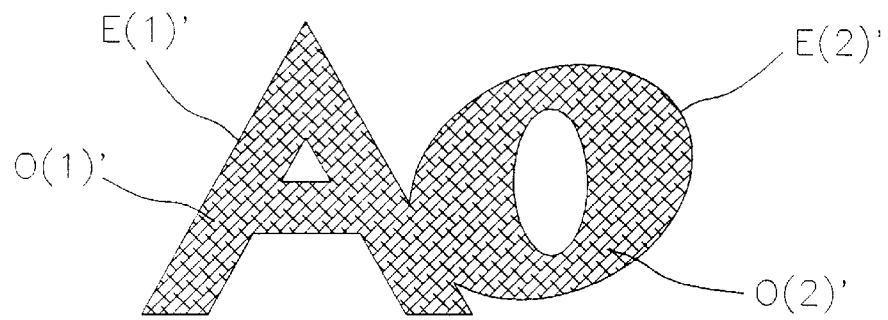
Figure 3C:
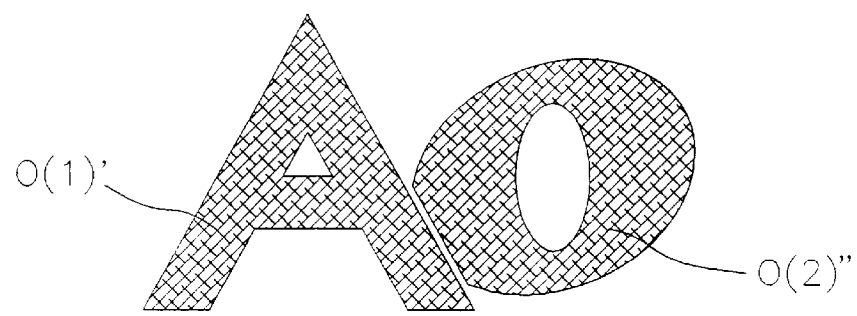

The exterior contour reconstruction block 25 reconstructs a current exterior contour based on the decoded contour data inputted thereto and modifies the reconstructed current contour not to overlap with other previously reconstructed contours in the memory 27. That is, after reconstructing the current exterior contour, the exterior contour reconstruction block 25 retrieves the previously reconstructed contours from the memory 27 to detect whether there exist any contours overlapping with the reconstructed current contour. If there is a previously reconstructed contour overlapping with the current contour, the exterior contour reconstruction block 25 replaces an overlapping portion of the reconstructed current contour with a new contour segment not overlapping with the previously reconstructed contour. In other words, as shown in FIG. 3B, if a reconstructed current contour E(2)' overlaps with a previously reconstructed contour E(1)', object O(2)' and O(1)' defined by respective contours E(2)' and E(1)' are merged into one object. In such a case, the portion of the object O(2)' overlapping with the object O(1)' is declared as a part of the object O(1)' and an altered contour segment is drawn outside the previously reconstructed contour. In a preferred embodiment of the invention, the altered contour segment is being made by connecting pixels belonging to the object O(2)' and neighboring to the previously reconstructed contour E(1)'. As a result, two different contours O(1) and O(2) shown in FIG. 3A can be partitioned into two objects O(1)' and O(2)'' as shown in FIG. 3C. The reconstructed current exterior contour data is then fed to the memory 27 and stored therein.

Figure 4B:
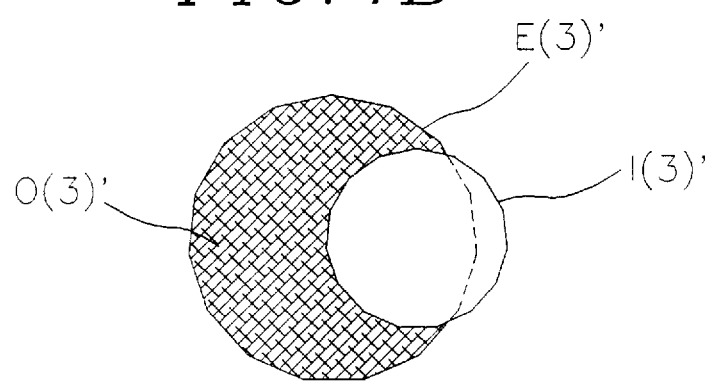
Figure 4C:
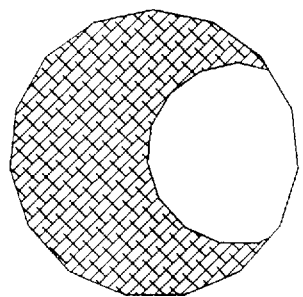

Meanwhile, the interior contour reconstruction block 26 reconstructs a current interior contour with reference to the previously reconstructed exterior contours provided thereto from the memory 27. That is, the interior contour reconstruction block 26 reconstructs the current interior contour based on the decoded contour data thereof provided from the switch 24 and finds a matching exterior contour of the current interior contour among the previously reconstructed contours in the memory 27. In other words, if the reconstructed current interior contour is of an index I(n)', the interior contour reconstruction block 26 finds the contour with an index E(n)' among the previously reconstructed contours from the memory 27, the contours of indices I(n)' and E(n)' being interior and exterior contours of an object O(n)', respectively. Then, the interior contour reconstruction block 26 checks if the contour I(n)' protrudes E(n)' or not. If not, the interior contour reconstruction block 26 provides the reconstructed current interior contour data to the memory 27 without any further processing. If the contour I(n)' sticks out of the contour E(n)', the interior contour reconstruction block 26 removes the portion of the contour I(n)' residing the contour E(n)' and provides the memory 27 with the contour data for the remaining part of the contour I(n)'. For instance, the reconstructed current interior contour I(3)' of the object O(3)' sticks out of its corresponding reconstructed exterior contour E(3)' as shown in FIG. 4B. In such a case, the portion of the contour I(3)' lying outside the contour E(3) is not considered as a part of the interior contour and, therefore, is discarded to thereby provide only the reconstructed interior contour included inside its corresponding exterior contour as in FIG. 4C. As a result, the interior contour is reconstructed not to protrude the exterior contour in which it is to be included. The reconstructed current interior contour data is coupled to the memory 27 and stored therein. It should be apparent from the above that in accordance with the present invention an exterior contour of an object should be reconstructed prior to an interior contour of the object in order to properly reconstruct the interior contour.

The memory 27 stores all the reconstructed contours inputted thereto from the exterior and the interior contour reconstruction blocks 25 and 26 and provides the stored contours therein as a reference in reconstructing a current contour. When the reconstruction of all the contours is completed, reconstructed contour data for the stored contours in the memory 27 is provided to a next processor(not shown) for the reconstruction of the image data of the objects While the present invention has been described with respect to the preferred embodiments, other modifications and variations may be made without departing from the spirit and scope of the present invention as set forth in the following claims.

What is claimed is:

1. A method for reconstructing a contour of an object in an image having one or more objects therein based on encoded contour data for the contour and a previously reconstructed contour for an object included in the image, the method comprising the steps of:

(a) decoding encoded contour data for a current contour to thereby provide a reconstructed current contour;

(b) checking whether the reconstructed current contour overlaps with any of previously reconstructed contours;

(c) if none of the previously reconstructed contours overlaps with the reconstructed current contour, setting the reconstructed current contour as a currently reconstructed contour; and (d) if the reconstructed current contour overlaps with a previously reconstructed contour, modifying the reconstructed current contour not to overlap with the previously reconstructed contour and setting the modified contour as the currently reconstructed contour.

2. A method for use in a contour decoder for reconstructing a contour of an object in an image having one or more objects therein based on encoded contour data for the contour, wherein each contour in the image is categorized either as an exterior or as an interior contour, the encoded contour data for each contour includes an index identifying the type of each contour and an object to which each contour belongs, when an object has an exterior and an interior contours, encoded contour data for the exterior contour is inputted to the contour decoder prior to encoded data for the interior contour, the method comprising the steps of:

(a) decoding the encoded contour data for a first contour to thereby generate a reconstructed first contour;

(b) decoding encoded contour data for a next contour to thereby detect the type thereof and provide a reconstructed next contour;

(c) checking whether the reconstructed next contour overlaps with any of previously reconstructed contours;

(d) if none of the previously reconstructed contours overlaps with the reconstructed next contour, setting the reconstructed next contour as a currently reconstructed contour;

(e) if the reconstructed next contour is of the exterior type and overlaps with a previously reconstructed contour, modifying the reconstructed next contour not to overlap with the previously reconstructed contour and setting the modified contour as the currently reconstructed contour;

(f) if the reconstructed next contour is of the interior type and overlaps with a previously reconstructed exterior contour of an identical object, altering the reconstructed next contour not to overlap with the previously reconstructed exterior contour and setting the altered contour as the currently reconstructed contour; and (g) repeating said steps (b) to (f) for each of the remaining contours.

3. An apparatus for reconstructing a contour of an object in an image having one or more objects therein based on encoded contour data for the contour and a previously reconstructed contour for an object included in the image, wherein each contour in the image is either as an exterior or an interior contour type, the encoded contour data for each contour includes an index identifying the type of each contour and an object to which said each contour belongs and an exterior contour is reconstructed prior to an interior contour of an identical object, said apparatus comprising:

means for storing one or more previously reconstructed contours;

means for decoding encoded contour data for a current contour to thereby detect the type of the current contour and provide a reconstructed current contour; and means, in response to the type of the current contour, for modifying the reconstructed current contour not to overlap with any one of the previously reconstructed contours.

4. The apparatus according to claim 3, wherein said modifying means includes:

means, if the reconstructed current contour is of the exterior contour type, for altering the reconstructed current contour such that an object defined by the altering contour does not overlap with any of the previously reconstructed contours of the exterior contour type; and means, if the reconstructed current contour is of the interior contour type, for changing the reconstructed current contour such that the modified contour is positioned inside an area defined by a previously reconstructed exterior contour of the current object.

5. The apparatus according to claim 4, wherein said altering means has:

means for checking whether the reconstructed current contour overlaps with any of the previously reconstructed contours of the exterior type; and means for altering the reconstructed current contour if any of the previously reconstructed contours is found to be overlapping therewith and storing the altered contour as a reconstructed contour for the current contour and, if otherwise, storing the reconstructed current contour as the reconstructed contour for the current contour.

6. The apparatus according to claim 5, wherein said changing means has:

means for checking whether the reconstructed current contour overlaps with any of the previously reconstructed exterior contours of the current contour; and means for changing the reconstructed current contour if any one of the previously reconstructed exterior contours overlaps therewith and storing the modified contour and, if otherwise, storing the reconstructed current contour as the reconstructed contour for the current contour.

* * * * *

UNITED STATES PATENT AND TRADEMARK OFFICE
CERTIFICATE OF CORRECTION

PATENT NO. : 5,878,170
DATED : March 2, 1999
INVENTOR(S) : Jin-Hun Kim

It is certified that error appears in the above-identified patent and that said Letters Patent is hereby corrected as shown below:

On the title page, item [30]:

Foreign Application Priority Data

Apr. 11, 1997   [KR]   Rep. of Korea   97-13368

Signed and Sealed this

Fifteenth Day of June, 1999

Attest:

Q. TODD DICKINSON

*Attesting Officer*   Acting Commissioner of Patents and Trademarks